United States Patent [19]

Heath et al.

[11] Patent Number: 5,332,139
[45] Date of Patent: Jul. 26, 1994

[54] FLUIDIZED BED APPARATUS AND METHOD USING SAME

[75] Inventors: James E. Heath, Fridley; John R. Eppeland, St. James; James S. Nelson, Mounds View, all of Minn.

[73] Assignee: BGK Finishing Systems, Inc., Blaine, Minn.

[21] Appl. No.: 56,566

[22] Filed: May 3, 1993

Related U.S. Application Data

[63] Continuation of Ser. No. 956,834, Oct. 5, 1992, abandoned, which is a continuation of Ser. No. 598,415, Oct. 16, 1990, abandoned, which is a continuation-in-part of Ser. No. 535,468, Jun. 8, 1990, abandoned.

[51] Int. Cl.⁵ .............................................. B02C 21/00
[52] U.S. Cl. ................................... 266/172; 266/252; 432/58
[58] Field of Search .................. 266/172, 252, 87; 432/58, 15

[56] References Cited

U.S. PATENT DOCUMENTS

| | | | |
|---|---|---|---|
| 3,404,874 | 10/1968 | Wynne | 266/207 |
| 3,685,165 | 8/1972 | Deve | 432/15 |
| 4,399,984 | 8/1983 | Bouchon | 266/172 |
| 4,437,834 | 3/1984 | Vogel | 432/64 |
| 4,491,277 | 1/1985 | Bauer et al. | 241/5 |
| 4,563,151 | 1/1986 | Vogel | 432/15 |
| 4,700,766 | 10/1987 | Godderidge | 164/5 |
| 4,738,615 | 4/1988 | Bailey et al. | 432/15 |
| 4,752,061 | 6/1988 | Dalton et al. | 266/252 |
| 4,780,966 | 11/1988 | Harding | 432/15 |
| 4,800,252 | 1/1989 | Steixner | 219/306 |
| 4,818,849 | 4/1989 | Matlen | 219/364 |
| 4,885,454 | 12/1989 | Lavoie et al. | 266/252 |
| 4,978,076 | 12/1990 | Andrews et al. | 241/5 |
| 5,189,813 | 3/1993 | Heath et al. | 266/103 |

FOREIGN PATENT DOCUMENTS

| | | |
|---|---|---|
| 0868253 | 4/1971 | Canada . |
| 868257 | 4/1971 | Canada . |
| 1193067 | 9/1985 | Canada . |
| 0025818 | 4/1981 | European Pat. Off. . |
| 0060303 | 9/1982 | European Pat. Off. . |
| 0122029 | 10/1984 | European Pat. Off. . |
| 3622668 | 2/1988 | Fed. Rep. of Germany . |
| 2618539 | 1/1989 | France . |
| 1293187 | 10/1972 | United Kingdom . |

Primary Examiner—Scott Kastler
Attorney, Agent, or Firm—Merchant, Gould, Smith, Edell, Welter & Schmidt

[57] ABSTRACT

An apparatus is disclosed for heat treating a product. The apparatus includes a retort having a volume sized to receive a bed of fluidized particles having a predetermined elevation within the volume and a plurality of electrically powered infrared radiation sources. The sources are submerged within the bed of fluidized particles. Use of the apparatus to reclaim foundry sand is also disclosed.

15 Claims, 4 Drawing Sheets

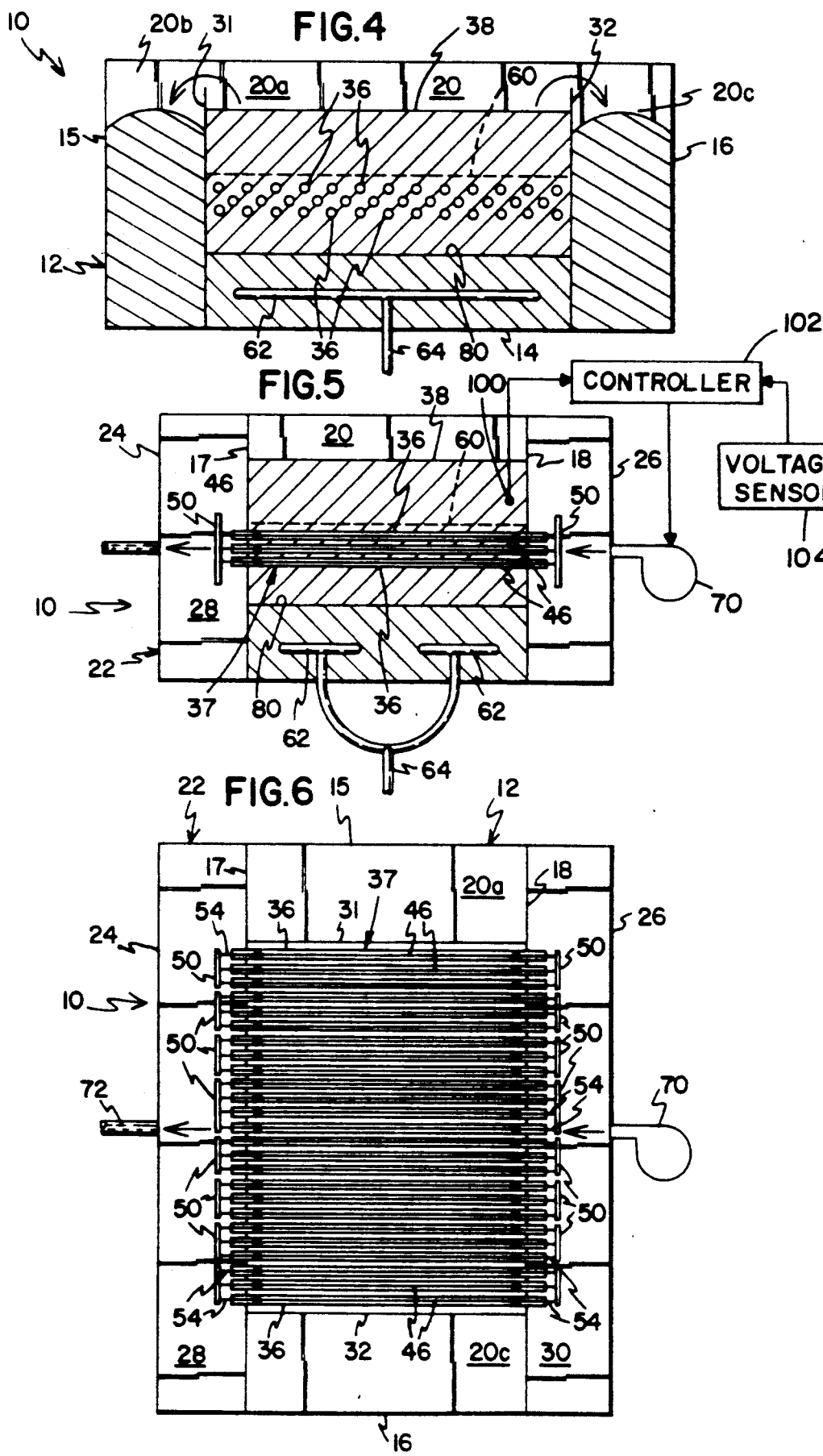

FLUIDIZED BED APPARATUS AND METHOD USING SAME

CROSS REFERENCE TO RELATED APPLICATION

This is a continuation, of application Ser. No. 07/956,834 filed Oct. 5, 1992 now abandoned, which is a continuation of Ser. No. 07/598,415, filed Oct. 16, 1990 now abandoned, which is a continuation-in-part of U.S. patent application Ser. No. 07/535,468 entitled "Fluidized Bed With Submerged Infrared Lamps" filed Jun. 8, 1990 now abandoned.

BACKGROUND OF THE INVENTION

1. Field of the Invention

This invention pertains to improvements in controlled heat treating processes and apparatus. More particularly, this invention pertains to a fluidized bed heat treatment apparatus with submerged infrared radiation heating sources. The invention also pertains to a method of using such an apparatus for reclaiming foundry sand.

2. Description of the Prior Art

The use of fluidized bed furnaces for heat treating a product is well known. Such furnaces heat a bed of particles so as to develop an extremely hot bed of fluidizing particles such as, for example, aluminum oxide. The furnaces can be used for both the continuous processing of a product or the batch processing products.

U.S. Pat. No. 4,752,061 teaches a fluidized bed furnace which uses infrared radiation as the heating source. One advantage of using infrared radiation as the heating source is that it permits the use of inert gases to fluidize the particles within the furnace. As a result, a controlled atmosphere can be provided surrounding the product being heat treated within the furnace.

The aforenoted U.S. Pat. No. 4,752,061 places the infrared lamps out of the bed behind a quartz wall or screen. As a result, the distance from the infrared lamps to the bed results in the development of a high temperature gradient within the bed with too little of the energy source contributing to the heating of the bed. This leads to a significant amount of energy inefficiency. In addition, the infrared lamps may be disposed in close proximity to the stainless steel retort. This could result in partial melting of the retort.

SUMMARY OF THE INVENTION

According to a preferred embodiment of the present invention, an apparatus is disclosed for heat treating a product. The apparatus includes a retort having walls defining a furnace volume. A bed of fluidized particles is disposed within the volume. A plurality of electrically powered infrared sources are provided in a submerged mode or manner within the bed. The application also discloses a method of reclaiming foundry sand using the novel apparatus.

BRIEF DESCRIPTION OF THE DRAWINGS

Various other objects, features, and attendant advantages of the present invention will become more fully appreciated from the following detailed description, when considered in connection with the accompanying drawings, in which like reference characters designate like or corresponding parts throughout the several views, and wherein:

FIG. 4 is a side elevation schematic representation of the furnace of the present invention;

FIG. 5 is an end elevation view, shown schematically, of the furnace of the present invention;

FIG. 6 is a top plan view, shown schematically, of the furnace of the present invention.

DESCRIPTION OF THE PREFERRED EMBODIMENT

A. Description of the Apparatus

Figure 1:
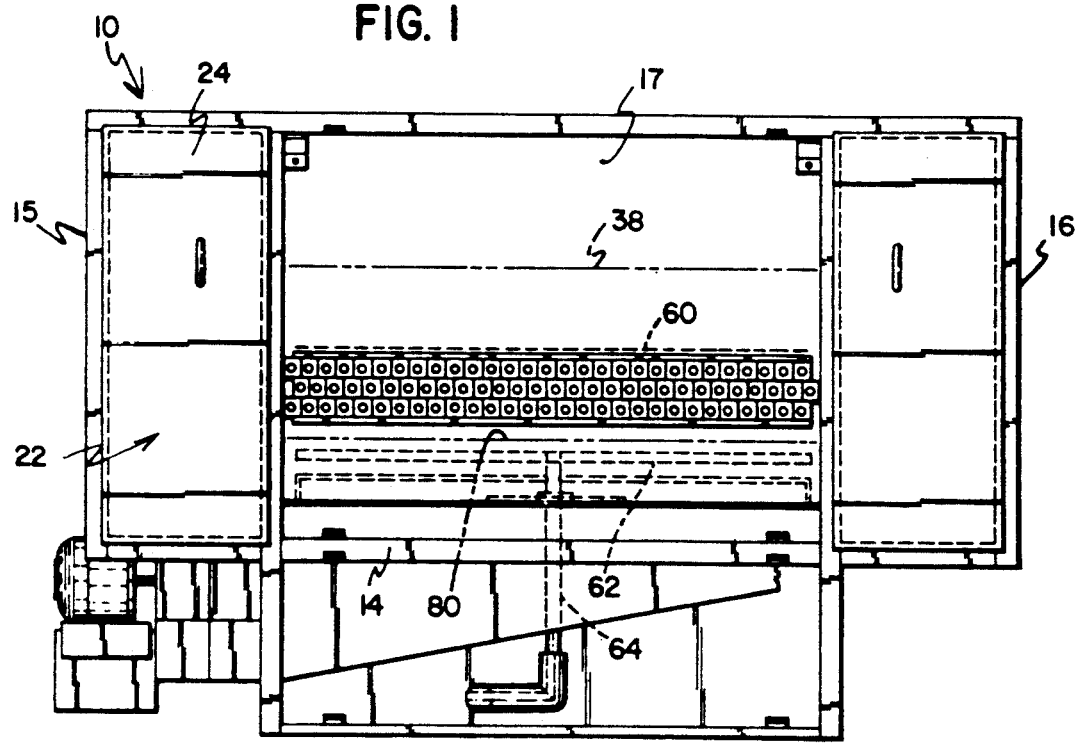
FIG. 1 is a side elevation view of a fluidizing bed furnace constructed according to the present invention, with a portion of an outer skin removed so as to expose certain interior elements of the furnace.

Referring now to the various figures in which identical elements are numbered identically throughout, the description of the preferred embodiment will now be given with reference to a furnace of the present invention which is generally designated by means of the reference character 10. As is shown best in FIGS. 4 and 5, the furnace 10 includes a retort 12, which is preferably formed of R330 stainless steel or the like. The retort 12 includes a bottom wall 14, end walls 15, 16 and side walls 17, 18. Walls 14–18 cooperate with each other so as to define a retort interior 20. A cover (not shown in the Figures) may be provided so as to cover the top of the retort 12.

The furnace 10 also includes an outer shell 22 which is shown best in FIGS. 5 and 6. Outer shell 22 includes a first outer shell wall 24 covering wall 17, and a second outer shell wall 26 covering wall 18. In FIG. 1, a central portion of shell wall 24 has been removed so as to expose wall 17. Wall 24 and wall 17 cooperate with each other so as to define an exhaust plenum 28. Walls 26 and 18 cooperate with each other so as to define an inlet plenum 30.

As is best shown in FIGS. 4 and 6, interior divider walls 31 and 32 are provided within the interior 20. Walls 31, 32 extend upwardly between side walls 17 and 18 and are disposed parallel to end walls 15 and 16. The divider walls 31, 32 extend from floor 14 and terminate beneath partially toward the top of the retort 12. Walls 31, 32 divide retort interior 20 into a fluidizing chamber 20a, a first overflow chamber 20b, and a second overflow chamber 20c (see FIG. 4).

A plurality of quartz tubes 36 extend between and through walls 17 and 18. As shown, the tubes 36 are disposed in parallel alignment with respect to each other are generally perpendicular to side walls 17, 18 and are parallel to the floor 14 of the retort 12. The tubes 36 are disposed within the fluidizing portion 20a of interior 20, and are located beneath a predetermined elevation 38 (see FIG. 4) of the fluidizing particles to be retained within the chamber 20a.

Figure 3:
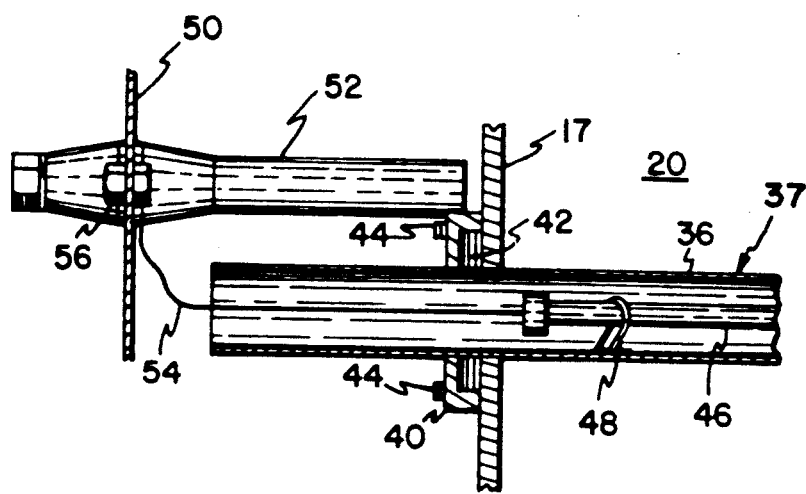
FIG. 3 is a side elevation view, shown partially in section, showing the connection of the infrared heating elements to the bus plates.

FIG. 3 shows the attachment of each the tube 36 to the side wall 17. The quartz tube 36 is similarly attached to side wall 18. As shown in FIG. 3, the tube 36 extends through side wall 17, and is connected to the side wall 17 by means of a steel mounting clamp 40. The clamp 40 houses a plurality of ceramic washers 42. The clamp 40 is attached to side wall 17 by means of bolts 44.

An infrared lamp 46 is disposed within each one of the tubes 36, as best shown in FIGS. 2, 3, 5 and 6, (for clarity, the lamps are not shown within the tubes 36 in FIGS. 1 and 4). Each lamp 46 is completely contained between walls 17, 18, and is retained in coaxial alignment within its respective tube 36 by means of a mounting clip 48.

Figure 2:
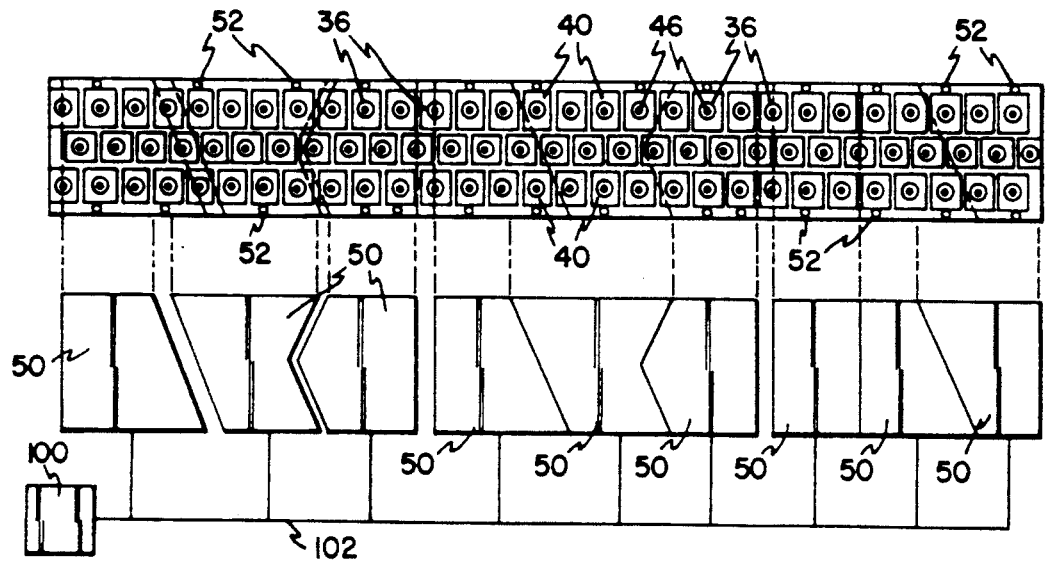
FIG. 2 is an enlarged view of certain interior elements of the furnace of FIG. 1, with the bus plates shown removed.

In order to provide electrical energy to the plurality of lamps 46, a plurality of bus bar plates 50 are provided. (For clarity purposes, the bus bar plates are not shown in FIGS. 1 and 4.) As shown in FIG. 2, nine bus bar plates are provided for each side wall 17, 18 of the retort 12. In the schematic representation of FIG. 6, eight bus bar plates are shown for each side wall.

The bus bar plates 50 are electrically conductive plates of metal. Each plate 50 is connected to a separately controllable source (not shown) of electrical power for energizing the particular plate 50.

The plates 50 are secured to the walls 17, 18 by means of bus bar plate mounts 52 (see FIG. 3), which are preferably ceramic. A lead 54 connects each infrared lamp 46 to one of the bus bar plates 50. The lead 54 is connected to the bus bar plate 50 by means of a nut and bolt combination 56.

As best shown in FIG. 2, a plurality of lamps 46 are covered by means of a predetermined bus bar plate 50. In the expanded view of FIG. 2, each of the bus bar plates 50 is removed from covering the lamps 46 and tubes 36. The positioning of the bus bar plates 50 over the lamps 46 in FIG. 2 is shown in phantom lines. As a result of having a plurality of lamps 46 covered by means of a plurality of different bus bar plates 50, the length of the fluidizing chamber 20a can be divided into a plurality of zones. Each bus bar plate 50 with its associated lamps 46 constitutes a given zone. By separately regulating the current supplied to each bus bar plate 50, the intensity of the lamps connected to such bus bar plate 50 can be separately controlled. As a result, a temperature gradient can be created across the length of the chamber 20a.

As is shown in FIGS. 1, 4 and 5, a stainless steel screen 60 is placed above the lamps 46 and quartz tubes 36. The screen 60 prevents a product that is being heat treated within the furnace from falling onto the quartz tubes 36 and possibly damaging them.

Fluidizing tubes 62 are disposed between the floor 14 and the quartz tubes 36. The tubes 62 are connected by means of a conduit 64 to a source (not shown) of a fluidizing gas. The fluidizing gas may be air or any inert gas such as, for example, nitrogen. The fluidizing tubes 62 may be such as those shown and described in U.S. Pat. No. 4,752,061 and indicated by means of reference numeral 98 in FIG. 5 of that patent.

A coolant mechanism is provided for conducting a cooling fluid (preferably air) through the tubes 36 so as to cool the infrared lamps 46. A blower 70 is connected to inlet plenum 30. An exhaust fan (not shown) may be connected through means of an exhaust conduit 72 to exhaust plenum 28. As a result, cooling air may be forced from plenum 30 through each of tubes 36 into plenum 28 and out exhaust conduit 72.

A bed of fluidizing particles (preferably granular aluminum oxide) is provided within the retort 12. A first layer 80 of coarse particles (preferably of 12 grit size) is provided for covering the fluidizing tubes 62 and such layer terminated beneath the quartz tubes 36. Finer aluminum oxide sand (preferably of 100 grit size) rests on top of the coarser sand 80, and terminates at level 38. The coarser sand 80 diffuses the fluidizing gas from fluidizing tubes 62, and distributes it evenly to the quartz tubes 36.

In operation, the infrared lamps 46 may be heated from 0°–4000° F. The aluminum oxide will heat from 0°–2100° F. A controller 100 (schematically shown in FIG. 2) is connected through means of control lines 102 to each of the bus plates 50. Through means of the operation of controller 100, the potential upon each one of the bus plates 50 may be separately controlled. Accordingly, the plurality of infrared lamps 46 are divided into a plurality of separately controllable zones.

In operation, the lamps 46 heat the aluminum oxide. The fluidizing gas from tubes 62 fluidizes the aluminum oxide. The divider walls 31, 32 capture within chambers 20b and 20c any aluminum oxide which spills out of the fluidizing chamber 20a.

Each one of the lamps 46 and tubes 36 comprise a lamp assembly 37 (shown numbered in FIGS. 3, 5 and 6). As previously indicated, a cooling gas is passed through the lamp assemblies 37. In operation, the temperature of the apparatus can be quite high. For example, the temperature surrounding the assemblies 37 will commonly exceed 2,100° F. At temperatures in excess of 1,500° F., the quartz tubes 36 may deteriorate. For example, from 1,500° to 1,800° F., quartz softens and sags.

The air passing through the quartz tubes 36 cools the quartz tubes 36 so as to prevent sagging. However, the air flow can adversely affect the efficiency of the infrared lamps 46. Accordingly, air flow through the quartz tubes 36 must be balanced to provide sufficient cooling of the lamps so as to prevent the quartz tubes 36 from sagging while minimizing the adverse impact upon the efficiency of the lamps 46.

In order to achieve the desired balancing, air flow through the quartz tubes 36 is preferably only provided when the temperature of the fluidized bed 38 exceeds a predetermined temperature in accordance with a preferred embodiment, the predetermined temperature being, for example, 1,500° F.

The amount of air flow through the tubes 36 is selected so as to balance the thermal energy impressed upon the tubes 36. Namely, the bed draws thermal energy from the tubes 36. If the thermal energy drawn from the tubes 36 is insufficient to maintain the temperature of the tubes 36 below the predetermined temperature, air flow is passed through the tubes 36 at a rate selected to draw energy away from the tubes 36. The amount of air flow is a function of the length of the tubes 36, the voltage across the lamps 46 and the ambient temperature (that is, the temperature of the bed within the immediate vicinity of the tubes 36). The actual amount of air flow is empirically derived for a given apparatus 10 and will vary with the operating process in which it is used.

In order to achieve the balancing, a thermocouple 101 (schematically shown only in FIG. 5) is provided for sensing the temperature within bed within the vicinity of the tubes 36. Thermocouple 101 provides a signal to a controller 103. The controller 102 also receives an input signal from a voltage sensor 104 which senses a voltage across the lamps 46. Comparing the voltage upon the lamps 46 and the temperature within the bed, the controller 103 operates blower 70 so as to force coolant gas through the quartz tubes 36 when the temperature within the bed exceeds the predetermined temperature. The air flow through the quartz tubes 36 is selected so as to be an increasing function of the voltage across the lamps 46 and to be increasing with the increased temperature measured by means of the thermocouple 100. The increasing function is selected for the air flow to be the minimum air flow necessary to prevent deterioration of the quartz tubes 36.

The preferred embodiment discloses use of air cooled lamp assemblies 37. A further embodiment may replace the assemblies with resistance type silicon carbide heating elements (also called glow bars). These elements may be electrically energized so as to be heated and generate infrared radiation. These elements may be used in direct contact with the bed and do not require quartz conduits (such as tubes 36) or air cooling. Such elements are commercially available such as, for example, those marketed by Smith-Sharpe of Minneapolis, Minn.

B. Novel Method for Foundry Sand Reclamation Using the Novel Apparatus

The apparatus 10 described above has been illustrated for heat treating a product within a fluidized bed. In addition to such beneficial uses, we have determined that the apparatus 10 is surprisingly useful for reclaiming foundry sand.

In the foundry industry, various types of sands are used so as to form moldings from which metal castings are made. These sands include so-called "no-bake" sands and so-called "green" sand. A no-bake sand includes an organic binder which is air-cured so as to bind the sand into a sand casting. Green sand includes an inorganic binder which is baked so as to bind the sand into a casting.

Government agencies (such as, for example, the U.S. Environmental Protection Agency) have severely restricted the disposal of foundry sand. For example, foundry sand cannot be readily disposed of within landfills since it is considered a hazardous material.

Various methods have been devised to reclaim foundry sand. No-bake sand is reclaimed through means of a mechanical method of passing the sand through a crusher and a scrubber so as to reclaim approximately 80% of the sand.

The foundry industry has been experimenting with various methods to reclaim sand through means of various temperature applications (referred to in the industry as "killing" the sand at elevated temperatures). For example, the industry has used gas fired fluidized beds to thermally reclaim the sand. An example of such a method is found in U.S. Pat. No. 4,478,572.

In order to reclaim green sand, the sand must be heat treated to temperatures in excess of 1,400° to 1,500° F. When natural gas is used as the heat source, a substantial amount of gas is required. In addition, the capital cost of such equipment is very high.

We have found that our apparatus is particularly suitable for reclaiming foundry sand including green sand. In order to accomplish this, the foundry sand is used as the fluidized bed within the furnace 10 instead of using the granular aluminum oxide previously described as the preferred fluidized bed material.

Figure 7:
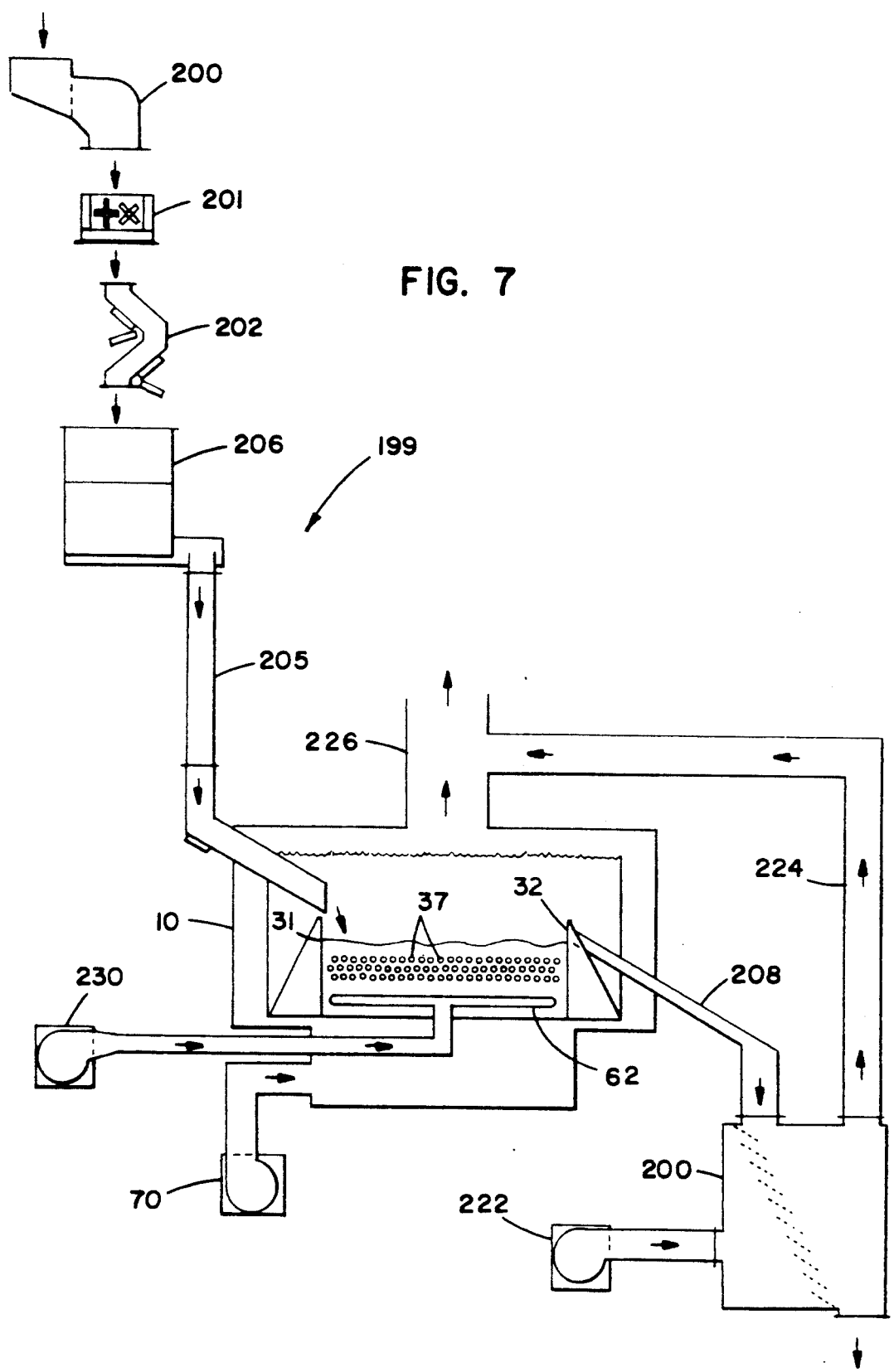
FIG. 7 is a schematic diagram of a processing system using the apparatus of the present invention within a processor for reclaiming foundry sand.

FIG. 7 shows, in schematic format, the use of the apparatus 10 to reclaim green sand. As shown in FIG. 7, a reclamation system 199 includes feed hopper 200 for passing sand to a crusher 201. Crusher 201 crushes the sand and passes it to a magnetic separator 202 so as to separate out ferromagnetic material. A metering hopper 206 collects sand from separator 202 and feeds the separated sand (by means of a conduit) 205, to the furnace 10. The fully reclaimed sand is passed from apparatus 10 through means of a discharge conduit 208.

The hot reclaimed sand is passed from discharge conduit 208 to a cascade cooler 220. A blower 222 blows cooling air into cooler 220 and the air is exhausted through means of a conduit 224 to main exhaust conduit 226 from which it passes to filters and scrubbers (not shown).

A blower 230 forces air into the fluidizing tube 62. In use of the apparatus 10 for foundry sand recovery, the fluidizing gas is oxygen-containing (preferably air) with the oxygen reacting with the sand binder. Resulting product gas (such as, for example $CO$, $CO_2$) and dust are drawn off through means of main conduit 226.

Use of the furnace 10 to reclaim foundry sand has been operated with no-bake sand at 750° F. with a reclamation rate of approximately 94% by weight, of the sand. In addition, 94% of green sand has been reclaimed when operating the furnace at a fluidized bed temperature of 1,400° to 1,600° F. The latter is of substantial significance to the foundry industry which, prior to the present invention, was not capable of economically reclaiming green sand.

The present apparatus has numerous advantages for use in reclaiming foundry sand. It has a much lower capital cost than prior thermal treatment apparatus for foundry sand. It operates at a much lower energy cost than prior thermal treatment apparatus and has a fast through-put rate.

The actual physics and chemistry by means of which the apparatus 10 is so effective in reclaiming sand is not fully understood. However, it is believed that the submergence of an infrared heat source within the bed of sand causes individual sand grains to experience momentary periods of very high temperature. For example, while the bed may have an average temperature of approximately 1,400° F., individual grains of sand come into momentary close proximity to submerged heat sources (that is, the IR lamps or glow bars) which may have very high temperatures. It is suspected that the momentary very high temperature makes the sand binders brittle and burn off. As a result, the sand reclaimed through means of the novel method requires very little scrubbing as compared to sand reclaimed through means of prior art techniques.

Through the foregoing detailed description of the present invention, it has been shown how the invention has been obtained in a preferred manner. However, modifications and equivalents of the disclosed concepts, such as those which will readily occur to one skilled in the art, are intended to be included within the scope of this invention which is defined by means of the appended claims.

What is claimed is:

1. A method for reclaiming used foundry sand within a retort having walls for defining a volume for receiving a bed of said sand disposed within said volume, said method comprising the steps of:

admitting used foundry sand, containing binders, into said volume so as to define a bed of said foundry sand within said volume;

disposing a plurality of electrically powered infrared radiation generating lamps, for generating infrared radiation heat for heating said bed of said used foundry sand, within said bed with each of said lamps disposed submerged within said bed and surrounded by said sand for said sand surrounding said lamps to be exposed to infrared radiation generated by said lamps;

energizing said lamps so as to generate infrared radiation for said radiation from said lamps to project onto opposing sand and with said lamps having an intensity for said radiation to heat said sand to separate said sand from said binders to as to reclaim said sand;

fluidizing said bed of said used foundry sand while heating said bed of said used foundry sand by means of said lamps; and discharging said heat treated reclaimed sand from said bed of said used foundry sand such that said reclaimed foundry sand can again be used as foundry sand in forming sand casting molds.

2. The method as set forth in claim 1, further comprising the step of:

conducting said used foundry sand through a magnetic separator, prior to said admission of said used foundry sand into said volume, so as to separate said sand from ferromagnetic material which may be present within said sand.

3. The method as set forth in claim 1, wherein: said used foundry and comprises no-bake sand; and said bed of said no-bake foundry sand is heated to a temperature level of approximately at least 750° F.

4. The method as set fourth in claim 1, wherein: said used foundry sand comprises green sand; and said bed of said green foundry sand is heated to a temperature level of approximately 1400°–1600° F.

5. The method as set forth in claim 1, wherein: said bed is fluidized with air.

6. Apparatus for reclaiming used foundry sand, comprising:

a retort having walls for defining a volume;

means for charging used foundry sand containing binders into said volume so as to form a bed of said used foundry sand disposed within said volume;

a plurality of electrically powered infrared radiation generating lamps, for generating infrared radiation heat for heating said bed of said used foundry sand to a temperature level so as to separate said sand from said binders so as to reclaim said sand, each of said lamps disposed submerged within said bed and surrounded by said sand for said sand surrounding said lamps to be exposed to infrared radiation generated by said lamps;

means for introducing a fluidizing gas into said bed of said used foundry sand; and means for discharging said heat treated reclaimed sand from said means defining said volume such that said reclaimed foundry sand can again be used as foundry sand for forming sand casting molds.

7. Apparatus as set forth in claim 6, further comprising:

magnetic separating means for separating said used foundry sand, prior to said charging of said used foundry sand into said means defining said volume, from ferromagnetic materials which may be present within said used foundry sand.

8. Apparatus as set forth in claim 6, wherein: said used foundry sand comprises no-bake sand; and said sources of infrared radiation heat said bed of used foundry sand to a temperature level of approximately at least 750° F.

9. Apparatus as set forth in claim 6, wherein: said used foundry sand comprises green sand; and said sources of infrared radiation heat said bed of used foundry sand to a temperature level of approximately 1400°–1600° F.

10. Apparatus as set forth in claim 6, wherein: said fluidizing gas is air.

11. A method according to claim 7 wherein said plurality of lamps are disposed in a plurality of independent zones with each of said zones containing a plurality of said lamps, said method including energizing lamps of at least one zone independent of energization of lamps of other of said zones.

12. An apparatus according to claim 6 wherein said plurality of lamps includes a plurality of zones containing a plurality of said lamps, lamps within each of said zones being separately controllable from lamps contained in others of said zones for lamps within a zone to be operated independent of lamps of a different zone.

13. An apparatus for reclaiming use of foundry sand, comprising:

means defining a volume for receiving a bed of used foundry sand containing binders;

means for charging said used foundry sand into said means defining said volume as to form a bed of said used foundry sand having an elevation disposed with said volume, said means for charging said used foundry sand into said means defining said volume including providing an entrance end of said volume and a discharge end of said volume;

a plurality of electrically powered infrared radiation generating lamps, for generating infrared radiation heat for heating said bed of said used foundry sand to a temperature level so as to separate said sand from said binders, said lamps disposed within said bed with said sand surrounding each of said lamps for said sand opposing said lamps to be exposed to infrared radiation generated by said lamps;

said plurality of lamps divided into a plurality of separately controllable zones of said lamps extending from said entrance end to said discharge end with lamps of each zone operable independent of others of said zones to permit varying infrared intensity between lamps of different zones;

a plurality of infrared transparent conduits surrounding each of said lamps; and means for introducing a fluidizing gas into said bed of said used foundry sand.

14. A method according to claim 1 wherein each of said lamps is disposed within an infrared transparent conduit separating said lamps from said sand.

15. An apparatus according to claim 6 wherein each of said lamps is disposed within an infrared transparent conduit separating said lamps from said sand.

* * * * *

UNITED STATES PATENT AND TRADEMARK OFFICE
CERTIFICATE OF CORRECTION

PATENT NO. : 5,332,139
DATED : July 26, 1994
INVENTOR(S) : James E. Heath et al.

It is certified that error appears in the above-indentified patent and that said Letters Patent is hereby corrected as shown below:

Column 1, line 30, insert --of-- after the word "processing".

Column 2, line 3, "an" should read --the--.

Column 2, line 51, insert --upwardly-- after the word "extend".

Column 2, line 52, "partially toward" should read --and terminate beneath--.

Column 2, line 65, delete "the" after the word "each".

Column 4, line 1, "terminated" should read --terminates--.

Column 4, line 8, "heat" should read --be heated--.

Column 4, line 62, "within" (first occurrence) should read --within the--.

Column 5, line 7, "100" should read --101--.

Column 7, line 9, "to as" should --so as--.

Column 7, line 27, "and" should read --sand--.

Column 8, line 5, "heat" should read --being capable of heating--.

UNITED STATES PATENT AND TRADEMARK OFFICE
CERTIFICATE OF CORRECTION

PATENT NO. : 5,332,139

DATED : July 26, 1994

INVENTOR(S) : James E. Heath et al.

It is certified that error appears in the above-indentified patent and that said Letters Patent is hereby corrected as shown below:

Column 8, line 10, "heat" should read --being capable of heating--.

Column 8, line 20, "other" should read --others--.

Signed and Sealed this

Seventeenth Day of January, 1995

Attest:

BRUCE LEHMAN

*Attesting Officer*     *Commissioner of Patents and Trademarks*